US008789686B2

(12) United States Patent
Lindemann

(10) Patent No.: US 8,789,686 B2
(45) Date of Patent: Jul. 29, 2014

(54) MOTORIZED CONVEYOR ROLLER FOR CONVEYOR SYSTEMS FOR CONVEYING CONTAINERS, PALLETS AND THE LIKE

(71) Applicant: Interroll Holding AG, Sant' Antonino (CH)

(72) Inventor: Harry Lindemann, Wermelskirchen (DE)

(73) Assignee: Interroll Holding AG, Sant' Antonino (CH)

( * ) Notice: Subject to any disclaimer, the term of this patent is extended or adjusted under 35 U.S.C. 154(b) by 0 days.

(21) Appl. No.: 13/907,604

(22) Filed: May 31, 2013

(65) Prior Publication Data

US 2013/0334012 A1 Dec. 19, 2013

(30) Foreign Application Priority Data

Jun. 1, 2012 (DE) ...................... 20 2012 005 380 U

(51) Int. Cl.
*B65G 13/06* (2006.01)
(52) U.S. Cl.
CPC ..................................... *B65G 13/06* (2013.01)
USPC .......................................... 198/788; 198/789
(58) Field of Classification Search
CPC ............................... B65G 13/06; B65G 13/071
USPC ............................... 198/788, 789, 781.02, 619
See application file for complete search history.

(56) References Cited

U.S. PATENT DOCUMENTS

| 3,362,760 | A * | 1/1968 | Serenetz | 384/480 |
| 2006/0151299 | A1 * | 7/2006 | Schaefer | 198/788 |
| 2011/0062000 | A1 * | 3/2011 | Yamamoto | 198/789 |

FOREIGN PATENT DOCUMENTS

| DE | 10 2010 014174 A1 | 10/2011 |
| FR | 2826070 A1 | 12/2002 |

OTHER PUBLICATIONS

European Search Report in Application No. 13169625.4 dated Aug. 8, 2013.

* cited by examiner

*Primary Examiner* — Mark A Deuble
(74) *Attorney, Agent, or Firm* — Kilpatrick Townsend & Stockton LLP

(57) ABSTRACT

Disclosed is a motor-operated conveyer roller for conveyor systems, having a roller body, a drive device arranged inside an interior space of the roller body, and a coupling device designed to transmit a torque from the drive device to an inner peripheral surface of the interior space of the roller body, wherein said coupling device has a clamping bushing, a clamping ring which can move axially with respect to the clamping bushing, a fastener element for the purpose of holding a clamping ring in a tensioned position against the clamping bushing, and a thrust collar which is fixed between a contact surface of the clamping bushing and a contact surface of the clamping ring in the tensioned position, wherein the thrust collar is frictionally connected via its outer periphery to the inner peripheral surface of the interior space of the roller body in the tensioned position.

17 Claims, 4 Drawing Sheets

Figure 1:
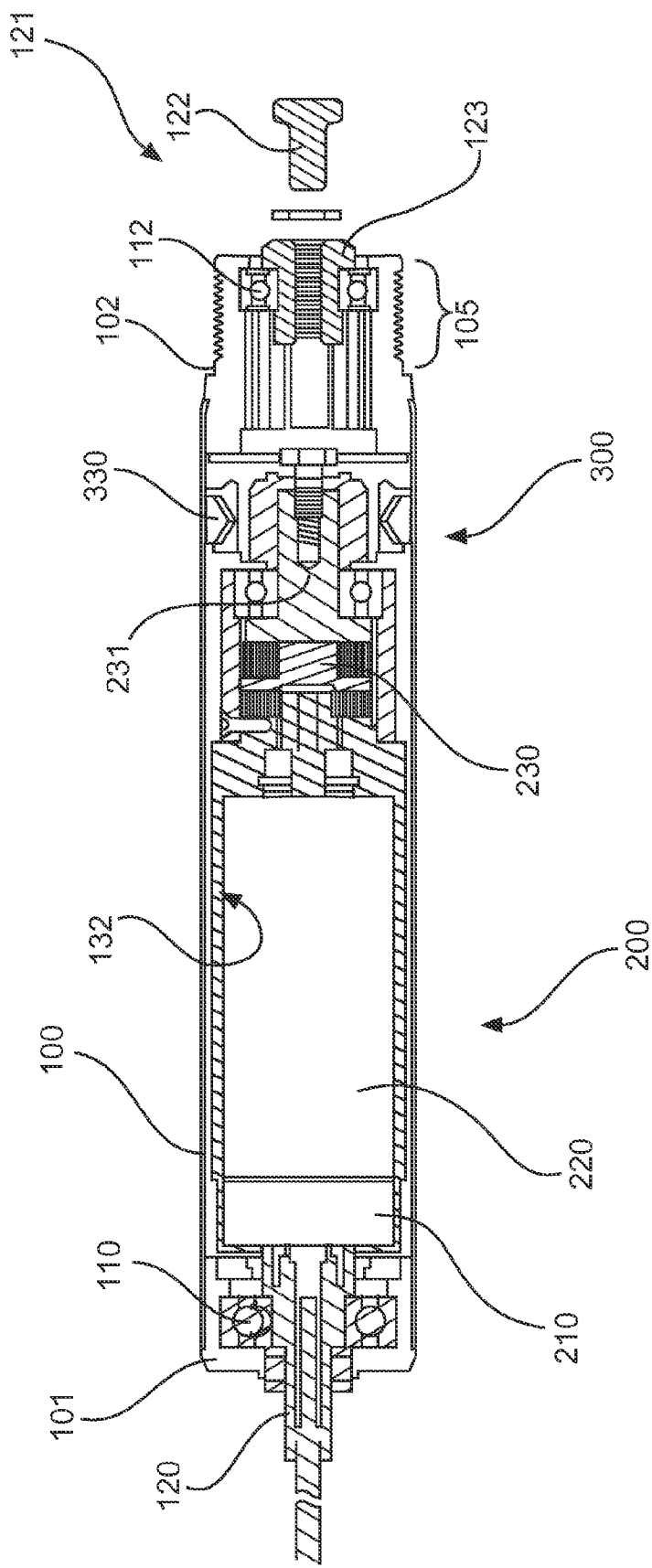

MOTORIZED CONVEYOR ROLLER FOR CONVEYOR SYSTEMS FOR CONVEYING CONTAINERS, PALLETS AND THE LIKE

This application claims priority to German Application No. 20 2012 005 380.9 filed on Jun. 1, 2012, the disclosure of which is incorporated by reference herein.

The invention relates to a motor-operated conveyer roller for conveyor systems which convey containers, palettes, and the like, having a roller body, wherein the outer peripheral surface thereof is a contact surface for conveyed goods, having a drive device which is arranged inside an interior space of the roller body, and having a coupling device which is designed to transmit a torque from the drive device to an inner peripheral surface of the interior space of the roller body, wherein said coupling device has a clamping bushing, a clamping ring which can move axially with respect to the clamping bushing, a fastener element for the purpose of holding a clamping ring—the same mounting axially—in a tensioned position against the clamping bushing, and a thrust collar which is fixed between a contact surface of the clamping bushing and a contact surface of the clamping ring in the tensioned position, wherein the thrust collar is frictionally connected to the inner peripheral surface of the interior space of the roller body in the tensioned position. An additional aspect of the invention is a method for the production of such a motor-operated conveyor roller.

Motor-operated conveyor rollers with this type of construction are used for various different purposes in logistics settings. By way of example, they can be used for the conveyance of palettes, for the conveyance of packages in package shipping centers, for the conveyance of containers in various different types of storage facilities, or for the transport of luggage in airports—as well as in numerous other applications. In such cases, motor-operated conveyor rollers are generally used in conveyor paths composed of multiple rollers arranged next to each other, wherein each of the upper peripheral surfaces thereof serves the purpose of receiving the conveyed goods. In these conveyor paths, coaster rollers are included as one component, and these are simply mounted in a conveyor frame system in a manner allowing rotation, without being driven. Driven conveyor rollers are included as an additional component of these conveyor paths, operated by a motor and made to rotate by an electrical drive device. These motor-operated conveyor rollers are constructed in such a manner that the drive device itself is arranged inside the roller, such that there is no need for mechanical components arranged outside of the roller body to generate the rotation of the roller. The motor-operated conveyor rollers serve the purpose of transporting the conveyed goods directly upon the outer peripheral surface of the roller body, wherein it is also possible to use the motor-operated conveyor roller to make the coaster rollers rotate by means of transmitting the rotation of the motor-operated conveyor roller to one or more coaster rollers by means of a transmission element—for example a belt drive—in order to apply the drive movement to the conveyed good via the outer peripheral surface of the coaster rollers as well.

A motor-operated conveyor roller is known from EP 1 656 312 B1, wherein the drive device is arranged inside the conveyor roller. This motor-operated conveyor roller has a pressing device which comprises a first and a second disk, wherein these define a V-shape on the outer peripheral thereof. An elastic clamping ring is inserted into the same. The two disks can be pushed and pressed together by means of a central screw on a conical drive shaft of the drive device. In this case, a torque-proof force-fit connection is created with the drive shaft between one of the two disks, while at the same time the clamping ring is moved out of a position wherein it can be guided into the interior space of the roller body, and compressed into a tensioned position in which the clamping ring is deformed outward from the radial center, such that it forms a pressing seat both for the two conical contact surfaces of the disks which form the V-shape, and also to the inner peripheral surface of the roller body. The drive torque of the drive device is transmitted to the roller body by this force-fit coupling. The disclosure from EP 1 656 312 B1 is hereby incorporated in its entirety in the disclosure of the present description. In particular, the disclosure of the arrangement of the drive device as concerns the roller body in FIGS. 1 and 2, paragraphs [0068] to [0087], and the transmission of torque via the pressing device in FIG. 5 and in paragraphs [0088] to [0094], is hereby incorporated.

This known, motor-operated conveyor roller enables a reliable transmission of the rotary torque of the drive device to the roller body, wherein it is possible to set a defined rotary torque and a defined rotary torque boundary by means of the pressing device. The problem addressed by the present invention is that of further improving this motor-operated conveyor roller in such a manner that the noises of the conveyor roller which occur during operation thereof are reduced.

This problem is solved according to the invention by a motor-operated conveyor roller in the class described above, wherein the clamping bushing of the coupling element has a hollow interior space, and the fastener element is arranged outward from the radial center of this hollow space.

The invention is based on the recognition that conventional options, such as optimizing the material pairings in a gearing or radial bearing, geometric optimization of a gear toothing in a gearing or a bearing, and optimization of the electrical drive motor, can only achieve a limited degree of noise reduction, and in particular, it is not possible to achieve values below a certain noise level. According to an experiment upon which the invention is based, this is due to the fact that a coaxial deviation occurs in the region of the coupling device and its connection to the drive device, to a very small degree which is nevertheless relevant for the generation of noise, as a result of the tolerances involved in the assembly of known conveyor rollers.

This coaxial deviation results in a force being applied radially to the drive device, resulting in the generation of noise. This noise generation can be caused, by way of example, by a radial bearing on the output end of the drive; however, it can particularly be caused by a gearing which is arranged on the output end of the drive between the coupling device and a drive motor of the drive device. Such a gearing can be designed as a planetary gear, for example, and as such has only a coaxial arrangement of the input and output shaft axes. However, when radial forces are created as a result of a deviation from [perfect] coaxial alignment, the gearing generates noises which become noticeable as the total noise of a conveyor roller.

By arranging the fastener element outward from the radial center of a hollow space of the clamping bushing, as according to the invention, the geometric tolerance with respect to this specific geometric degree of deviation of the coaxial alignment is significantly improved. In place of the central screw known in the prior art, which functions to tension the spring washer and clamping disk, thereby also fastening one of the two elements on the output drive shaft with a force-fit seat connection, the mounting of the clamping ring on the clamping bushing is achieved according to the invention by a fastener element which is positioned on a larger diameter. In this way, the coaxial alignment—meaning the position of the coupling device with respect to the drive device, as determined by the tolerance thereof—is decisively increased, thereby largely preventing undesired radial forces which are created by a deviation in the coaxial alignment between the coupling device and the drive device. A gearing or bearing on the output end of the drive is therefore subjected to lower radial forces compared to the prior art, and thereby the generation of noise is reduced.

According to the invention, it is possible to fasten the coupling device on the drive shaft of the drive device independently of the tension of the clamping bushing and clamping ring.

In particular, this independence means that the [process of] tensioning of the clamping ring and clamping bushing against each other, for the purpose of producing the friction fit via the clamping ring against the inner surface of the roller body, can be moved to any point in time with respect to the mounting of the drive device and coupling device to each other. This means that the drive device and coupling device can be mounted after the friction fit against the roller body has been established via the clamping ring, or before. In addition, as a result of the independent assembly of the coupling device itself, and of the coupling device on the drive device, it is possible to realize a geometry in the connection of the coupling device and the drive device which is advantageous for the manufacturing- and assembly tolerances. As such, on the one hand space is created by the arrangement according to the invention of the fastener element outward from the radial center of a hollow space of the clamping bushing, in order to also structure the working plane of the connection surface—meaning the effective contact region between the coupling element and the drive device—further outward from radial center, meaning with a larger outer diameter, compared to what was possible in the prior art. On the other hand, the arrangement according to the invention of the fastener element makes it possible for connection options to be created which can be realized with greater radial manufacturing precision as concerns both the manufacture and assembly thereof, and particularly without the need to use complex manufacturing techniques for this purpose which would lead to increases in the manufacturing costs, and without making it necessary to utilize costly precision parts. As such, it is possible to realize a positive-fitting connection option between the coupling device and the drive device which is advantageous with respect to both the manufacture and assembly thereof, by means of the hollow space inside the coupling element provided according to the invention, said hollow space not being limited by the space requirements of the fastener element because the same is arranged outward from the radial center of the hollow space, wherein said connection option can furthermore be advantageously designed in such a manner that it enables radial play to such a degree that it is possible to entirely prevent radial forces resulting from tensions [sic] which can themselves result from the connection of the coupling device and the drive device.

The hollow space provided according to the invention in the clamping bushing preferably extends from the center axis of the clamping bushing outward radially. The clamping bushing can preferably be designed in such a manner that it has a ring-shaped segment outside of this hollow space, and the spring washer can be arranged on the peripheral surface of the clamping bushing in a preferably axially movable manner. The spring washer itself can be capable of moving with more play on this peripheral surface of the clamping bushing, because a centering of the spring washer takes place by means of its contact surface, the thrust collar, and the contact surface of the clamping bushing. The contact surface of the clamping bushing can be made on the clamping bushing with a greater coaxial precision with respect to the longitudinal center axis of the clamping bushing, and to the geometry by means of which the clamping bushing is mechanically coupled to the drive device. In this manner, the coaxial alignment is established with the design according to the invention in a significantly more precise manner than in the prior art.

The hollow interior space of the clamping bushing can be designed in principle with various different geometries. Among these can be geometries wherein the outer diameter of the hollow interior space changes along the axial dimension, and the hollow space consists in principle of cylinder-shaped or conical segments. In addition, the hollow space can have other geometries which deviate from the cylindrical or conical shapes—for example geometries wherein the inner diameter is not constant at different distances from the radial center, including polygonal geometries or other cross-sections which deviate from a circular shape. Particularly a positive-fitting connection with the drive device can be established by means of these designs.

It should be fundamentally understood that the fastener element need not necessarily be arranged in an axial position which agrees with or overlaps that of the hollow space. Rather, it can be arranged in a position which is displaced axially from that of the hollow space. Embodiments according to the invention also include configurations wherein the fastener element is arranged in a region outside of the region of the hollow space of the clamping bushing.

The coupling device is specifically connected to the drive device in a torque-proof manner for the purpose of transmitting the torque. This torque-proof connection can be constructed between the clamping bushing and the drive device, or between the clamping ring and the drive device, or between both the clamping bushing and the clamping ring, and the drive device.

According to a first preferred embodiment, the fastener element is constructed integrally on the clamping ring, or the fastener element is a component which is separate from the clamping ring. In the case of an integral construction of the fastener element on the clamping ring, the fastener element can either be fastened on the clamping ring as a pre-assembled component, or can be designed as a single piece together with the clamping ring. In this case, the fastener element and the clamping ring are moved together relative to the clamping bushing, and then installed on the same and fixed in the tensioned position. If the fastener element is a component which is separate from the clamping ring, then the clamping ring and the fastener element can be manipulated during the assembly process independently of each other. In particular, the clamping ring can first be positioned on the clamping bushing, and then the fastener element can be fixed in its position on the clamping bushing by means of the subsequent position and attachment of the fastener element. In this case, the clamping ring can be tensioned directly by means of a tool in such a manner that the thrust collar is deformed outward radially into the tensioned position, or this tensioning force can be transmitted to the clamping ring via the fastener element.

It must be fundamentally understood that the fastener element is preferably a component which can be fixed on an outer peripheral surface, the same being designed with a suitable shape, in such a manner that axial movement is prevented in at least one direction. The fastener element can be designed as a nut, a Seeger ring, or a functionally similar fastener element.

It is further preferred for a fastening means to be constructed on the clamping bushing for the purpose of fastening the fastener element. The fastening means on the clamping bushing can be designed, by way of example, with the form of an outer threading, a shoulder, or a groove to accordingly receive the fastener element.

The conveyor roller according to the invention can be further developed by a bearing pin which comprises means for the torque-proof attachment [thereof] on a conveyor frame system on which the roller body is rotatably mounted, and on which the drive device is attached in a torque-proof manner. The bearing pin serves the purpose of establishing a torque-proof connection between a frame in which the conveyor roller can be mounted, and the drive device. For this purpose, the bearing pin can be connected to the drive device as a single component, or can be attached to the same in a torque-proof manner by means of fastener elements. An outer threading can be designed on the bearing pin on the side thereof facing the frame, wherein a nut can be screwed onto said threading, thereby creating a torque-proof connection to the frame by means of a friction fit. As an alternative or in addition thereto, the bearing pin can be designed having a cross-section geometry which deviates from a circular shape, in order to produce a positive-fit connection in a corresponding opening of the frame—for example by constructing the bearing pin with a polygonal segment. The bearing pin can furthermore include an axial, longitudinal bearing in order for power and control lines to be fed through the same to supply the drive device with power and control signals.

According to an additional preferred embodiment, the hollow interior space of the clamping bushing has a smallest inner diameter, and the fastener element is designed with a ring shape and an inner diameter which is larger than the smallest inner diameter. The inner diameter of the fastener element is preferably larger than the smallest inner diameter of the hollow space. This is particularly necessary if the fastener element is arranged in an axial position which overlaps this inner diameter, or is moved over this inner diameter of the hollow space during the assembly process. For additional improved function according to the invention, the inner diameter of the fastener element can also be larger than the largest inner diameter of the hollow space. It is preferred even more that the fastener element is connected to the clamping bushing in a positive-fitting manner when in the tensioned position. Such a positive-fit connection enables, on the one hand, the transmission and securing of large tensioning forces for the purpose of tensioning the clamping ring. A positive-fit connection of the fastener element to the clamping bushing also includes the advantageous feature of the position and tensioning force achieved in this way, the latter being exerted on the thrust collar via the contact surfaces positioned as such with respect to each other.

The conveyor roller can be further developed still if the fastener element can be deformed elastically and reversibly out of a tensioning position and into an assembly position, while being pre-tensioned when in the assembly position for a deformation which returns it to the tensioning position. By means of such an embodiment, it is possible, on the one hand, to carry out an efficient assembly of the fastener element in a simple assembly process, optionally with the use of a special tool. In addition, it is possible by means of such an embodiment of the fastener element to carry out a disassembly without destroying any components. This can be necessary and advantageous for the purpose of maintenance.

According to an additional preferred embodiment, the clamping bushing has a shoulder or a groove on an outer periphery thereof, and the fastener element is preferably a spiral spring washer which is elastically pre-tensioned for the purpose of a positive-fit anchoring in this shoulder or groove. This embodiment is preferred for an efficient assembly and reliable adjustment of a predetermined tensioning force on the thrust collar, because a defined position of the fastener element on the clamping bushing is achieved by means of the shoulder and/or the groove, and as a result the tensioning force with which the thrust collar is deformed outward from the radial center is likewise defined to a predetermined degree. A spiral spring washer can be elastically deformed by a corresponding collet device, from a small to a large inner diameter, and can be deformed towards radial center from this position of deformation outward from radial center, thereby being fixed axially in a positive-fitting manner in a circumferential groove or on a circumferential shoulder.

It is further preferred for the clamping bushing to be coupled to a drive shaft of the drive device in a torque-proof manner. By means of a torque-proof coupling of the clamping bushing to a driveshaft of the drive device, a direct transmission of torque is realized from the drive device to the thrust collar via the clamping bushing, and thereby an advantageous power transmission is realized. The torque-proof coupling can particularly be realized by a positive-fit or friction-fit connection, wherein a positive-fit connection is preferred due to the moderate radial play which can be realized in this manner in order to prevent the application of undesired radial forces resulting from a tensioning on the drive unit, said tensioning depending on the tolerance.

In this case, it is further preferred that a segment of the drive device, particularly a driveshaft or a segment of a drive gearing, is arranged inside the hollow space of the clamping bushing. By means of this arrangement, a particularly short construction of the conveyor roller is enabled because axial constructed space is saved by the accommodation of the segment of the drive device. In particular, the coupling device must have an axial length which is substantially determined by the axial length of the thrust collar, and can substantially correspond to said axial length without the coupling device having additional axial length components as a result of the torque-proof coupling to the drive device.

It is further preferred for the contact surface of the clamping bushing and/or the contact surface of the clamping ring to have a conical outer periphery. As a result of the conical design of one of the two contact surfaces, or both of these, a deformation of the thrust collar outward from radial center is achieved in a particularly efficient manner. In addition to other embodiments, such as convex or concave, or spherical or stepped embodiments, for example, the conical embodiment is best suited for the exertion, according to the invention, of a pressing force which is applied outward from radial center, in order to produce a reliable friction-fit connection to the roller body.

In this case, it is particularly preferred if the contact surface of the clamping bushing and the contact surface of the clamping ring define an outer peripheral V-shape, into which the thrust collar is inserted. The outer peripheral V-shape defined in this manner can be designed with a pointed or wide base of the V in order to be able to receive a clamping ring with a corresponding axial width, particularly in order to be able to also receive thrust collars having an axial length which is longer than the radial thickness of the thrust collar. The cone angles of the contact surfaces can be matched, or as an alternative the two contact surfaces can also be designed with different cone angles.

Finally, according to an additional preferred embodiment of the conveyor roller according to the invention, an elastomeric coupling element is arranged in the hollow space of the clamping bushing, and is preferably coupled in the torque power train between the drive device and the clamping bushing in a positive-fitting manner. By means of such an elastomeric coupling element, a rotary torque transmission is achieved which simultaneously achieves a rearward damping and therefore additional noise reduction, as well as preventing mechanical peak loads. The intermediate coupling position of the elastomeric coupling element in this case is functionally designed in such a manner that a rotary torque exerted by the drive device is initially transmitted to the elastomeric coupling element, and is then further transmitted from this elastomeric coupling element to the coupling device, particularly the clamping bushing.

An additional aspect of the invention is a method for the production of a conveyor roller, particularly the production of a conveyor roller having the construction described above, said method characterized by the following steps:

insertion of a coupling device having a clamping bushing, a clamping ring which is mounted to move axially toward the clamping bushing, and a thrust collar arranged between a contact surface of the clamping bushing and a contact surface of the clamping ring in the interior space of a roller body, pressing an outer peripheral surface of the thrust collar onto the inner peripheral surface of the interior space of the roller body for the purpose of generating a friction-fit connection which transmits rotary torque, by moving the contact surface of the clamping bushing and the contact surface of the clamping ring axially toward each other, and tensioning the thrust collar between the two, wherein the thrust collar is deformed outwards from radial center, fixing the clamping ring on the clamping bushing in the tensioned position by means of a fastener element, and inserting a drive device into the interior space of the roller body torque-proof connection of a drive shaft of the drive device to the clamping bushing, preferably by means of a positive-fit connection, torque-proof connection of the drive device to a bearing pin which has a means for the torque-proof attachment thereof to a conveyor frame system, and rotatable mounting of the roller body on the bearing pin.

By means of the production method according to the invention, an assembly process is provided which can be executed in an economically efficient manner, and at the same time provides for good coaxial alignment between the drive device, the coupling device, and the roller body, thereby largely avoiding radial forces which are applied to the drive device as a result of deviation in coaxial alignment which depends on tolerances. In this way, a reduction in the operating noises of the conveyor roller assembled in this way is achieved. It must be understood at this point that the assembly steps can be carried out in the sequence of the list given above; however, the method according to the invention also includes other sequences of the individual assembly steps which deviate therefrom.

In the method according to the invention it is particularly preferred that the fastener element is attached outward from radial center of a hollow interior space of the clamping bushing of the coupling element. A coaxial alignment is achieved by the positioning of the fastener element.

Finally, it is further preferred that the drive shaft of the drive device is connected to the clamping bushing in a torque-proof manner after the outer peripheral surface of the thrust collar has been pressed onto the inner peripheral surface of the interior space of the roller body for the purpose of generating a friction-fit, rotary torque-transmitting connection. By means of this sequence of assembly, it is possible to pre-assemble the coupling device inside the roller body in a particularly simple manner, and then subsequently insert the drive device into the round body [sic] and connect the same in a torque-proof manner to the coupling device.

Figure 2:
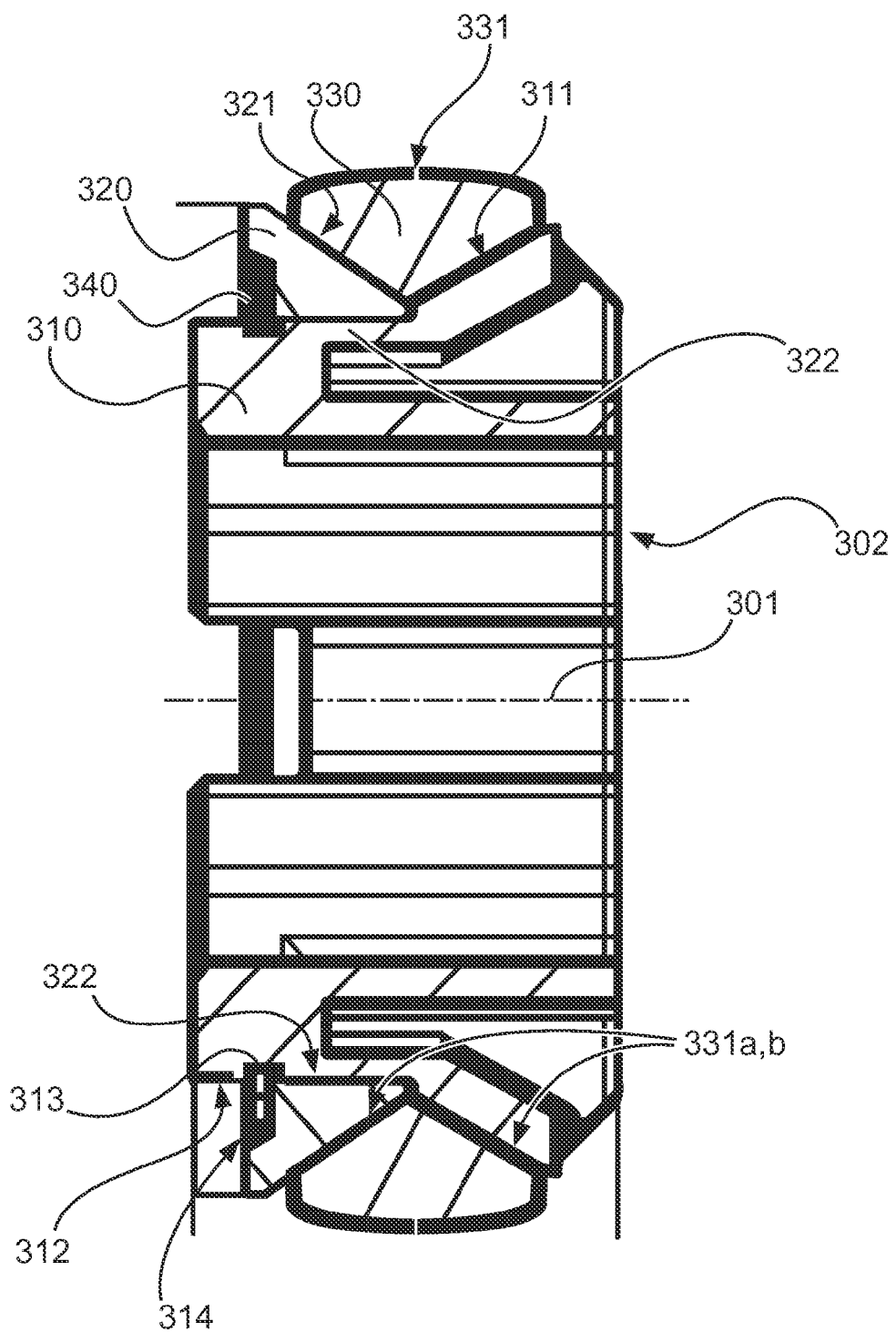
Figure 3:
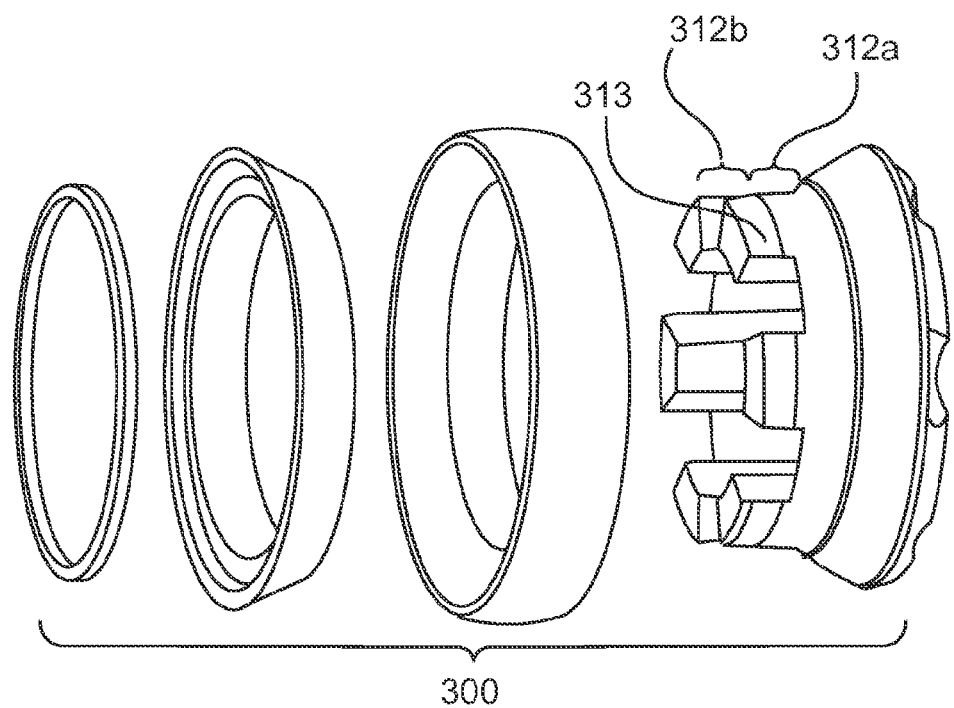
Figure 4:
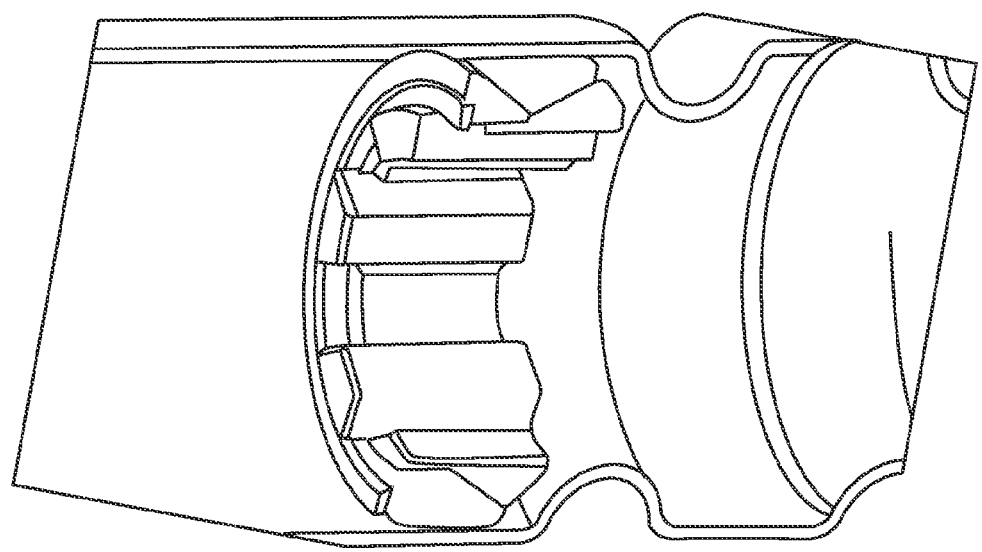
Figure 5:
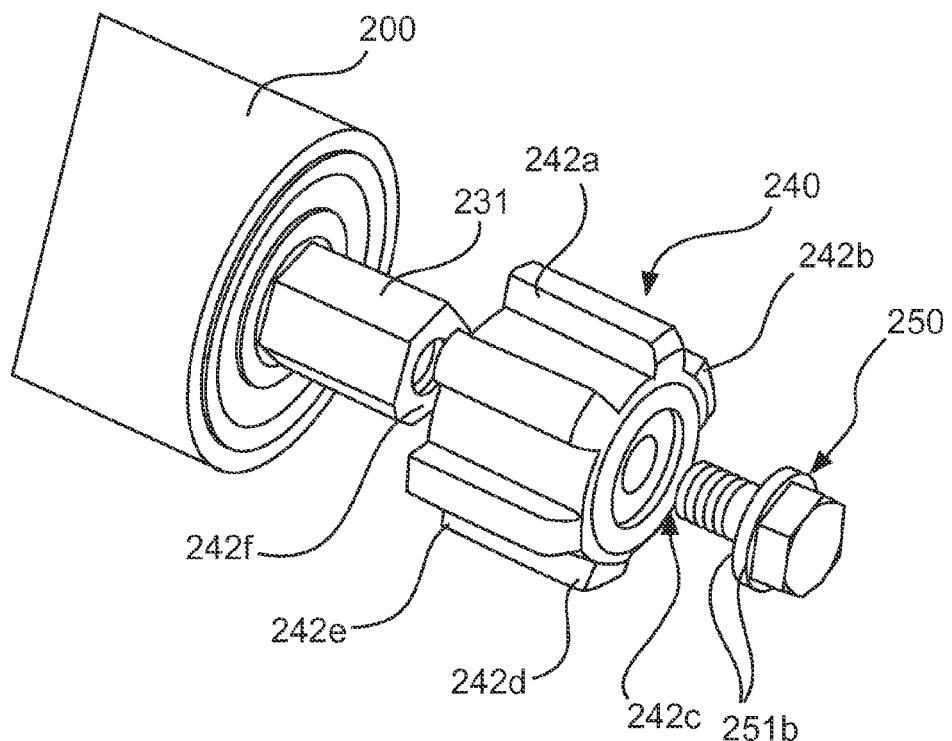
Figure 6:
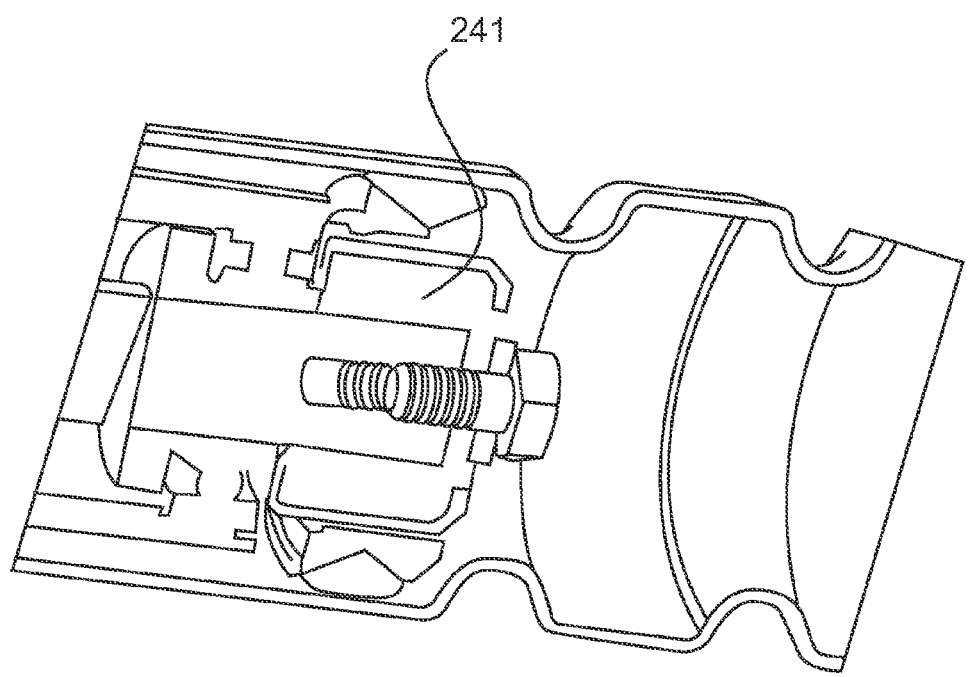

One preferred embodiment of the invention is described with reference to the figures, wherein:

FIG. 1 shows a longitudinal side cross-section of a conveyor roller according to the invention, FIG. 2 shows a detail view of the coupling device of the conveyor roller according to FIG. 1, FIG. 3 shows an exploded perspective view of the coupling device according to FIG. 2, FIG. 4 shows a perspective, longitudinal cross-section of a coupling device pre-assembled in a roller body, FIG. 5 shows a perspective view of a rearward-damping transmission element for the purpose of a positive-fit transmission of rotary torque between the drive shaft of the drive device and the coupling device, and FIG. 6 shows a perspective, longitudinal cross-section of a coupling device mounted in the roller body and coupled to a drive device.

FIG. 1 shows the fundamental construction of a motor-operated conveyor roller according to the invention. An end cap 101 which is fixed to a roller body 100 is inserted in the roller body [100], and a roller bearing 110 is arranged inside said end cap [101]. The roller bearing 110 serves the purpose of rotatably mounting a bearing pin 120. The bearing pin 120 has an outer threading on an end thereof which faces outward, wherein a nut is screwed onto said threading, and wherein the bearing pin can be attached by means thereof, in a torque-proof manner, in an opening of a frame, by clamping the frame between the nut and a sleeve fixed on the threading inward of the nut.

The roller body 100 has an inner peripheral surface 132 which is the radial boundary of an interior space in the roller body.

The bearing pin 120 is designed as hollow, and power and control lines are fed through the inner bore hole of the bearing pin 120 to a drive device 200. The drive device 200 is arranged inside the roller body 100, and is connected to the bearing pin 120 in a torque-proof manner. The drive device 200 has an electronic control device 210 on the end thereof which faces the bearing pin 120, for the purpose of controlling an electrical drive motor 220, the same preferably being designed as a brushless, three-phase direct current motor with inrunners. The drive motor 220 is arranged between the electronic control device 210 and a planetary gearing 230 of the drive device 200, the former being arranged on the end of the drive device which faces away from the bearing pin 120.

The planetary gearing 230 has a drive shaft 231 which is designed with a hexagonal cross-section and which is connected in a torque-proof manner to a coupling device 300. The coupling device 300 is fixed by a friction fit on the inner wall of the roller body by means of a thrust collar 330, and transmits the rotary torque of the drive device and the rotation of the drive shaft to the roller body. The roller body rotates as a result of this configuration relative to the bearing pin and the drive device 200, with the drive torque.

A head piece 102 is inserted into the roller body in a torque-proof manner on the end of the roller body which is opposite the bearing pin 120. This head piece carries multiple W-shaped peripheral grooves 105 by means of which the rotation and the torque of the conveyor roller can be transmitted to neighboring coaster rollers. A roller bearing 112 is arranged inside the head piece 102 for the purpose of mounting an end-face bearing pin 121. The bearing pin 121 is formed by a sleeve 123 which has an inner threading, said sleeve [123] being mounted on the inner ring of the roller bearing 112, and a screw 122 which can be inserted into this inner threading in order to make it possible to fasten the conveyor roller to a frame system on this end as well.

The conveyor roller can in principle be mounted in a frame system in another manner than by means of the bearing pin 121. As such, a design is both advantageous and falls within the scope of protection wherein, by way of example, a straight pin serves the purpose of making the attachment, rather than the bearing pin. This pin can be fastened on the conveyor roller, for example, particularly in the longitudinal dimension of the roller, in a manner allowing axial displacement and spring-loaded outward, in order to make a simple and rapid assembly of the conveyor roller possible. Such an axially movable bearing pin can optionally be mounted in the head piece 102 via a second, inner roller bearing, in order to fasten said bearing pin on the conveyor roller in a tilt-resistant manner and therefore compensate the non-tilt-resistant attachment of such a bearing pin in the frame. In a corresponding manner, another constructive embodiment can be used in place of the bearing pin 120, particularly a bearing pin having a non-cylindrical peripheral surface, for example a four- or six-sided shape, for the purpose of a torque-proof mounting of the conveyor roller in a corresponding, non-cylindrical opening in the frame.

FIGS. 2 to 4 show the coupling device 300 in different views. As can be seen in these figures, the coupling device has a clamping bushing 310, a clamping ring 320, a thrust collar 330, and a fastening ring element 340.

The clamping bushing 310 is designed as a ring-shaped element which has an outer, peripheral, conical contact surface 311 which is inclined at an angle of approximately 30 degrees to the central longitudinal axis 301 of the coupling device. The clamping bushing has a hollow interior space 302 which is bounded by a peripheral surface which has six radial depressions. The hollow interior space therefore provides a coarse inner threading.

A cylindrical outer peripheral surface 312 is arranged neighboring the contact surface 311. The cylindrical outer peripheral surface 312 has a continuous region around the periphery, as well as a non-continuous region around the periphery which is broken by six fingers extending axially with holes between the same. A peripheral annular groove 313 is cut into the outer peripheral surface 312 in the non-continuous region 312*b*.

The clamping ring 320 has a conical outer peripheral surface 321 [sic—312] which runs with a conical inclination that is opposite that of the contact surface 311 of the clamping bushing, and likewise assumes an angle of 30 degrees with respect to the central longitudinal axis 312 of the clamping device. The clamping ring has a cylindrical inner peripheral surface 322 with an inner diameter with a size which allows it to be slid over the outer peripheral surface 312 of the clamping bushing. As can be seen in FIGS. 2 and 4, the clamping ring can consequently be slid over the clamping bushing.

The thrust collar 330 is made of a material which possesses a more moderate elastic deformability compared to the clamping bushing and the clamping ring. In particular, the clamping bushing and the clamping ring can consist of a metal material, for example steel or aluminum, whereas the thrust collar 330 consists of a plastic, for example a rubber-elastic material such as polyurethane. The thrust collar 330 has a V-shape on the inner peripheral surface thereof, which is congruent to the V-shape formed by the contact surfaces 311, 321, and has two accordingly conically-inclined inner peripheral surfaces 331*a, b*. The outer peripheral surface 332 of the thrust collar is designed as cylindrical with a lesser convexity. The outer diameter of the clamping ring is such a size that it can be slid into the roller body 100 with less mounting force, or with no force, when in the non-tensioned position.

As can be seen in FIGS. 2 and 4, which show the coupling device in an assembled, tensioned position, the clamping ring 320 can be slid over the clamping bushing in such a manner that the contact surfaces 311, 321 approach each other and thereby press the thrust collar 330 outward from radial center as a result of the conical form of the contact surfaces. In this way, the outer diameter of the thrust collar is enlarged and the outer peripheral surface 332 of the thrust collar abuts the inner peripheral surface 132 of the roller body 100.

The clamping ring 320 is slid onto the clamping bushing by means of a tool having a retaining finger which extends through the hollow inner space 302 of the clamping bushing and is supported on the end face of the clamping bushing 310 situated at right in FIG. 2, and is pressed in the axial dimension until the end face of a shoulder surface 314 is slid over the annular groove 313. In this tensioned state, the spiral spring washer 340, the inner diameter of which is enlarged by elastic deformation, can be slid over the peripheral surface 312 of the clamping bushing and anchored in the annular groove in a positive-fitting manner. By means of this spiral spring washer, the clamping ring 320 is fixed in the tensioned position on the clamping bushing 310, and thereby the thrust collar 330 is held in the radially-outward deformed configuration. In the tensioned position defined as such, the thrust collar exerts a frictional adhesion force on the two contact surfaces 311, 321 and the inner peripheral surface 132 of the roller body which is sufficiently high to transmit the torque of the drive device 200 to the roller body 100.

FIG. 5 shows the drive device 200 with the drive shaft 231 projecting out of the same in the axial dimension toward the coupling device. The drive shaft 231 has a hexagonal cross-section and an inner threaded hole extending in the axial dimension, coaxially to the longitudinal center axis.

A rearward damping element 240 is designed as a two-piece component and has a ring-shaped body 241 made of a first plastic, in which a hollow space which has a hexagonal cross-section extends, said hollow space being congruent to the hexagonal shape of the drive shaft 231. By means of this hollow space, the rearward damping element can be fastened on the drive shaft 231 in a torque-proof manner. An axial bore hole is included in the metallic base body in one end of the rearward damping element which faces away from the drive device, for the purpose of securing this position, and a screw 250 is inserted through said bore hole and can be attached in the inner threading of the drive shaft. The screw is fastened by means of two flat washers 251*a, b* made of a rubber-elastic material, in order to prevent the undesired generation of radial forces by the tightening of the screw, along with the resulting undesired tensions.

The outer periphery of the metallic base body 241 is designed with six teeth 242*a-f* in the manner of a toothed wheel, and these are designed as congruent to the inner peripheral surface of the hollow space 302 of the clamping bushing. The outer periphery of the rearward damping element 240 is coated with a second plastic in order to thereby achieve a damping between the drive shaft 231 and the coupling device 300 both in the radial dimension and also around the periphery. The second plastic has a lower elasticity modulus than the first plastic. By way of example, the second plastic can be an elastomer, such as a rubber-elastic material, whereas the first plastic can be a rigid, high-strength plastic such as polyamide. The rearward damping element can particularly be produced by encasing the first plastic in the second plastic, such that this component can be produced in an injection molding process. As an alternative, a rubber-metal element could also be used.

The outer peripheral surface of the rearward damping element, which is in contact with the clamping bushing, is designed with a moderately convex shape. In this manner, a gently gimbaled coupling between the rearward damping element and the clamping bushing is achieved which results in an essentially complete prevention of radial forces exerted on the output bearing of the gearing when angular errors occur as the result of tolerances. This provides additional reduction of the noise level and a long service life of the gearing output bearing.

As can be seen in FIG. 6, the rearward damping element 240 can be entirely inserted into the hollow space 302 of the clamping bushing, and anchored in a torque-proof manner in the same. In this case, there is no axial fixing of the rearward damping element with respect to the clamping bushing; rather the rearward damping element remains movable with respect to the clamping bushing in the axial dimension when in the assembled position.

FIG. 6 further shows that the coupling device achieves a high degree of coaxial precision and tolerance with respect to axial tolerances and also with regards to the position relative to the longitudinal central axis, and therefore to the axis of rotation of the roller body, as a result of its mounting in the interior space of the roller body, said mounting being independent of the mounting of the drive device, by means of a spiral spring washer on the outer periphery of the clamping bushing. After the coupling device is fixed in the interior space of the roller body in this manner, the drive device can be slid into the roller body axially with the rearward damping element already mounted thereon, thereby establishing the rotary torque-transmitting positive fit connection between the rearward damping element and the coupling device. By means of—on the one hand, and particularly—the high degree of coaxial alignment of the clamping bushing with respect to the rotary axis of the roller body, and the associated precise centering of the interior space surfaces of the clamping bushing for the reception of the rearward damping element, radial forces are essentially entirely prevented on the drive shaft of the gearing. In addition, the exertion of axial forces on the drive shaft and therefore on the planetary gear of the drive device is essentially entirely prevented due to the option wherein the drive shaft is mounted with axial mobility relative to the coupling device, and remains mounted as such.

As such, an efficient and error-tolerant assembly process, as well as an economically efficient production of the components with the tolerances required for the precision [of the device] is enabled by the conveyor roller according to the invention. In addition, as can be seen in FIG. 6, a particularly short construction of the coupling device is realized, while presenting the option of accommodating a positive-fit connection between the output shaft of the gearing and/or the drive shaft and the coupling device, in the interior space of the coupling device, with a large effective torque-transmitting outer diameter. As a result of the high degree of coaxial alignment in the positioning of the coupling device with respect to the axis of rotation of the drive shaft and of the roller body, said alignment being achieved by the invention, noise-generating radial forces are prevented from being exerted on the drive shaft and the gearing.

The invention claimed is:

1. A motor-operated conveyor roller for conveyor systems for the purpose of conveying containers, palettes, and the like, having
    a roller body (100) with an outer peripheral surface which constitutes a contact surface for conveyed goods,
    a drive device (200) which is arranged inside an interior space of the roller body,
    a coupling device (300) designed to transmit a torque from the drive device to an inner peripheral surface of the interior space of the roller body, having
        a clamping bushing (310),
        a clamping ring (320) which can move axially relative to the clamping bushing,
        a fastener element (340) for the purpose of holding an axial-mounting clamping ring against the clamping bushing in a tensioned position, and
        a thrust collar (330) which is fixed in the tensioned position between a contact surface (311) of the clamping bushing and a contact surface (321) of the clamping ring, and which in the tensioned position has a friction-fit connection via the outer periphery thereof to the inner peripheral surface (132) of the interior space of the roller body,
    characterized in that the clamping bushing of the coupling element has an inner hollow space (302), and the fastener element (340) is arranged outward from the radial center of this hollow space.

2. A conveyor roller according to claim 1,
characterized in that
    the fastener element is designed as an integral component of the clamping ring, or
    the fastener element is a separate component from the clamping ring.

3. A conveyor roller according to claim 1, characterized in that a fastening means (313) for the fastening of the fastener element is designed on the clamping bushing.

4. A conveyor roller according to claim 1
characterized by a bearing pin (120) which
    has means for the torque-proof attachment thereof to a conveyor frame system,
    on which the roller body (100) is rotatably mounted, and
    on which the drive device (200) is attached in a torque-proof manner.

5. A conveyor roller according to claim 1,
characterized in that the inner hollow space (302) of the clamping bushing has a smallest inner diameter, and the fastener element is designed with a circular shape and has an inner diameter which is larger than the smallest inner diameter.

6. A conveyor roller according to claim 1
characterized in that the fastener element (340) is connected to the clamping bushing (310) in a positive-fitting manner in the tensioned position.

7. A conveyor roller according to claim 1
characterized in that the fastener element (340) can be reversibly, elastically deformed from a tensioned position into an assembly position, and in the assembly position is pre-tensioned for a return deformation into the tensioned position.

8. A conveyor roller according to claim 1
characterized in that the clamping bushing (310) has a shoulder or a groove (313) on an outer peripheral surface (312), and the fastener element is preferably a spiral spring washer which is elastically pre-tensioned for a positive-fit anchoring in this shoulder/this groove.

9. A conveyor roller according to claim 1,
characterized in that the clamping bushing is coupled to a drive shaft (231) of the drive device in a torque-proof manner.

10. A conveyor roller according to claim 1,
characterized in that one segment of the drive device, particularly a drive shaft (231) or a segment of a drive gearing, is arranged inside the hollow space of the clamping bushing.

11. A conveyor roller according to claim 1 characterized in that the contact surface (311) of the clamping bushing and/or the contact surface (321) of the clamping ring is/are designed with a conical outer periphery.

12. A conveyor roller according to claim 1 characterized in that the contact surface (311) of the clamping bushing and the contact surface (321) of the clamping ring define a V-shape on the outer periphery thereof, into which the thrust collar is inserted.

13. A conveyor roller according to claim 1,
characterized in that an elastomeric coupling element is arranged in the hollow space (302) of the clamping bushing which is preferably coupled in a positive-fitting manner in the power transmission train between the drive device and the clamping bushing.

14. A conveyor roller according to claim 1 characterized in that the elastomeric coupling element consists of a first and a second material, wherein the second material has a lower rigidity than the first material, and the coupling element therefore functions as a rearward damping element, and/or in that the outer peripheral surface which is in contact with the clamping bushing, or the inner surface of the coupling element which is in contact with the output shaft of the gearing, has a preferably convex contact surface for a gimbaled suspension of the clamping bushing on the coupling element and/or for the gimbaled suspension of the coupling element on the output shaft of the gearing.

15. A method for the production of a conveyor roller, particularly a conveyor roller according to claim 1, characterized by the following steps:
insertion of a coupling device (300) having a clamping bushing (310), a clamping ring (320) which is mounted to move axially toward the clamping bushing, and a thrust collar (330) arranged between a contact surface of the clamping bushing and a contact surface of the clamping ring in the interior space of a roller body (100), pressing an outer peripheral surface of the thrust collar onto the inner peripheral surface (132) of the interior space of the roller body for the purpose of generating a friction-fit connection which transmits rotary torque, by moving the contact surface of the clamping bushing and the contact surface of the clamping ring axially toward each other, and tensioning the thrust collar between the two, wherein the thrust collar is deformed outwards from radial center, fixing the clamping ring on the clamping bushing in the tensioned position by means of a fastener element (340), and inserting a drive device (200) into the interior space of the roller body torque-proof connection of a drive shaft (231) of the drive device to the clamping bushing, preferably by means of a positive-fit connection, torque-proof connection of the drive device to a bearing pin (120) which has a means for the torque-proof attachment thereof to a conveyor frame system, and rotatable mounting of the roller body on the bearing pin.

16. A method according to claim 15, characterized by the step:

Attachment of the fastener element outward from the radial center of a hollow inner space of the clamping bushing of the coupling element.

17. A method according to claim 15 characterized in that the drive shaft of the drive device is connected to the clamping bushing in a torque-proof manner after the outer peripheral surface of the thrust collar has been pressed onto the inner peripheral surface of the inner space of the roller body for the purpose of generating a friction-fitting, rotary torque-transmitting connection.

* * * * *